(12) United States Patent
Baskaran

(10) Patent No.: US 11,086,968 B1
(45) Date of Patent: Aug. 10, 2021

(54) SYSTEMS AND METHODS FOR MEMORY EFFICIENT PARALLEL TENSOR DECOMPOSITIONS

(71) Applicant: Reservoir Labs, Inc., New York, NY (US)

(72) Inventor: Muthu Manikandan Baskaran, Old Tappan, NJ (US)

(73) Assignee: Reservoir Labs, Inc., New York, NY (US)

( * ) Notice: Subject to any disclaimer, the term of this patent is extended or adjusted under 35 U.S.C. 154(b) by 0 days.

(21) Appl. No.: 16/000,486

(22) Filed: Jun. 5, 2018

Related U.S. Application Data

(60) Provisional application No. 62/515,199, filed on Jun. 5, 2017.

(51) Int. Cl.
*G06F 17/16* (2006.01)
*G06F 16/174* (2019.01)

(52) U.S. Cl.
CPC .......... *G06F 17/16* (2013.01); *G06F 16/1744* (2019.01)

(58) Field of Classification Search
CPC ....................................................... G06F 17/16
See application file for complete search history.

(56) References Cited

U.S. PATENT DOCUMENTS

| | | | | |
|---|---|---|---|---|
| 9,471,377 B2* | 10/2016 | Baskaran | .............. | G06F 9/4881 |
| 2015/0066486 A1* | 3/2015 | Kokkinis | ............ | G10L 21/0272 |
| | | | | 704/203 |
| 2015/0169369 A1* | 6/2015 | Baskaran | .............. | G06F 9/4881 |
| | | | | 718/102 |
| 2019/0228304 A1* | 7/2019 | Saito | ................... | G06F 16/9024 |
| 2019/0317945 A1* | 10/2019 | Ezick | .................... | G06F 3/0604 |

OTHER PUBLICATIONS

T. G. Kolda and B. W. Bader, "Tensor Decompositions and Applications," SIAM Review, vol. 51, No. 3, pp. 455-500, Sep. 2009.
M. Baskaran, B. Meister, N. Vasilache, and R. Lethin, "Efficient and Scalable Computations with Sparse Tensors," in IEEE High Performance Extreme Computing Conference, Waltham, MA, Sep. 2012.

(Continued)

*Primary Examiner* — Chuong D Ngo
(74) *Attorney, Agent, or Firm* — Goodwin Procter LLP

(57) ABSTRACT

In a system for improving performance of tensor-based computations and for minimizing the associated memory usage, computations associated with different non-zero tensor values are performed while exploiting an overlap between the respective index tuples of those non-zero values. While performing computations associated with a selected mode, when an index corresponding to a particular mode in a current index tuple is the same as the corresponding index from another, previously processed index tuple, the value already stored in a buffer corresponding to that particular mode is reused either wholly or in part, minimizing the processor usage and improving performance. Certain matrix operations may be iterated more than once so as to avoid the need to store a large partial result obtained from those operations. The performance overhead of the repeated operations is not significant, but the reduction in memory usage is.

36 Claims, 13 Drawing Sheets

(56) References Cited

OTHER PUBLICATIONS

M. Baskaran, B. Meister, and R. Lethin, "Low-overhead Load-balanced Scheduling for Sparse Tensor Computations," in IEEE High Performance Extreme Computing Conference, Waltham, MA, Sep. 2014.

J. Cai, M. Baskaran, B. Meister, and R. Lethin, "Optimization of Symmetric Tensor Computations," in IEEE High Performance Extreme Computing Conference, Waltham, MA, Sep. 2015.

D. Chen and R. J. Plemmons, "Nonnegativity constraints in numerical analysis," in Symposium on the Birth of Numerical Analysis, 2007.

E. C. Chi and T. G. Kolda, "On Tensors, Sparsity, and Nonnegative Factorizations," arXiv:1304.4964 [math.NA], Dec. 2011. [Online]. Available: http://arxiv.org/abs/1112.2414.

S. Smith and G. Karypis, "A Medium-Grained Algorithm for Distributed Sparse Tensor Factorization," in Parallel and Distributed Processing Symposium (IPDPS), 2016 IEEE International. IEEE, 2016.

J. H. Choi and S. Vishwanathan, "DFacTo: Distributed factorization of tensors," in Advances in Neural Information Processing Systems 27, Z. Ghahramani, M. Welling, C. Cortes, N. D. Lawrence, and K. Q. Weinberger, Eds. Curran Associates, Inc., 2014, pp. 1296-1304. [Online]. Available: http://papers.nips.cc/paper/5395-dfacto-distributedfactorization-of-tensors.pdf.

O. Kaya and B. Uçar, "Scalable sparse tensor decompositions in distributed memory systems," in Proceedings of the International Conference for High Performance Computing, Networking, Storage and Analysis, ser. SC '15. New York, NY, USA: ACM, 2015, pp. 77:1-77:11. [Online]. Available: http://doi.acm.org/10.1145/2807591.2807624.

O. Görlitz, S. Sizov, and S. Staab, "Pints: peer-to-peer infrastructure for tagging systems." in IPTPS, 2008, p. 19.

A. Carlson, J. Betteridge, B. Kisiel, B. Settles, E. R. Hruschka, Jr., and T. M. Mitchell, "Toward an architecture for never-ending language learning," in Proceedings of the Twenty-Fourth AAAI Conference on Artificial Intelligence, ser. AAAI'10. AAAI Press, 2010, pp. 1306-1313. [Online]. Available: http://dl.acm.org/citation.cfm?id=2898607.2898816.

S. Smith et al., "SPLATT: Efficient and Parallel Sparse Tensor-Matrix Multiplication," 2015 IEEE International Parallel and Distributed Processing Symposium, Hyderabad, India, pp. 61-70.

Ravindran et al., "Memory-Efficient Parallel Computation of Tensor and Matrix Products for Big Tensor Decomposition", 2014, IEEE, pp. 581- 585.

\* cited by examiner

CP-ALS Algorithm

1: initialize $\mathbf{A}^{(1)} \ldots \mathbf{A}^{(N)}$
2: repeat
3:    for $n = 1 \ldots N$ do
4:       $\mathbf{V} = *_{m \neq n} \mathbf{A}^{(m)T} \mathbf{A}^{(m)}$
5:       $\mathbf{U} = \mathbf{X}_{(n)}(\odot_{m \neq n} \mathbf{A}^{(m)})$
6:       $\mathbf{A}^{(n)} = \mathbf{U}\mathbf{V}^{\dagger}$
7:    end for
8: until convergence Algorithm 1A

FIG. 2A
(PRIOR ART)

CP-ALS-NN Algorithm

1: initialize $\mathbf{A}^{(1)} \ldots \mathbf{A}^{(N)}$
2: repeat
3:    for $n = 1 \ldots N$ do
4:       $\mathbf{V} = *_{m \neq n} \mathbf{A}^{(m)T} \mathbf{A}^{(m)}$
5:       $\mathbf{U} = \mathbf{X}_{(n)}(\odot_{m \neq n} \mathbf{A}^{(m)})$
6:       $\mathbf{A}^{(n)} = \mathbf{A}^{(n)} * \dfrac{\mathbf{U}}{\mathbf{A}^{(n)}\mathbf{V}}$
7:    end for
8: until convergence Algorithm 1B

FIG. 2B
(PRIOR ART)

| CP-APR Algorithm |
| --- |
| 1: initialize $A^{(1)} \ldots A^{(N)}$ |
| 2: repeat |
| 3:   for $n = 1 \ldots N$ do |
| 4:     $\Pi = (\odot_{m \neq n} A^{(m)})^T$ |
| 5:     repeat |
| 6:       $\Phi = (X_{(n)} \oslash (A^{(n)} \Pi)) \Pi^T$ |
| 7:       $A^{(n)} = A^{(n)} \ast \Phi$ |
| 8:     until convergence |
| 9:   end for |
| 10: until convergence |

Algorithm 2

FIG. 3
(PRIOR ART)

Algorithm 3 CP-APR Modified Algorithm

1: initialize $\mathbf{A}^{(1)} \ldots \mathbf{A}^{(N)}$
2: repeat
3:    for $n = 1 \ldots N$ do
4:       repeat
5:          $\Phi = (\mathbf{X}_{(n)} \oslash (\mathbf{A}^{(n)}(\odot_{m \neq n} \mathbf{A}^{(m)})^T))(\odot_{m \neq n} \mathbf{A}^{(m)})$
6:          $\mathbf{A}^{(n)} = \mathbf{A}^{(n)} * \Phi$
7:       until convergence
8:    end for
9: until convergence

FIG. 4B

Algorithm 4 Unified and optimized $\Phi$ and $\Pi$ computation for mode $n$ in CP-APR 1: $\mathbf{b} = \mathbf{0}$
2: for $p = 1 \ldots P$ do
3: $\quad q = \begin{cases} \text{diverging mode}(\mathbf{S}(p,:), \mathbf{S}(p-1,:)), \text{if } p > 1 \\ 1, \text{if } p = 1 \end{cases}$
4: $\quad$ for $m = q \ldots N$ do
5: $\quad\quad \mathbf{K}(m,:) = \begin{cases} \mathbf{A}^{(m)}(\mathbf{S}(p,m),:), \text{if } m = 1 \text{ or} \\ \quad (m = n+1 \text{ and } m \neq N) \\ \mathbf{K}(m-1,:) * \mathbf{A}^{(m)}(\mathbf{S}(p,m),:), \text{else} \end{cases}$
6: $\quad$ end for
7: $\quad w = \begin{cases} \mathbf{K}(n,:).\mathbf{K}(N,:), \text{if } n \neq N \\ \mathbf{K}(n,:).\mathbf{1}_R, \text{if } n = N \end{cases}$
8: $\quad u = \mathbf{v}(p)/w$
9: $\quad$ if $q \leq n$ then
10: $\quad\quad \Phi(n,:) += \mathbf{b}$
11: $\quad\quad \mathbf{b} = \mathbf{0}$
12: $\quad$ end if
13: $\quad \mathbf{b} += \begin{cases} u * \mathbf{K}(N,:), \text{if } n = 1 \\ u * \mathbf{K}(n-1,:), \text{if } n = N \\ u * \mathbf{K}(N,:) * \mathbf{K}(n-1,:), \text{else} \end{cases}$
14: end for

FIG. 6

| Mode | Index Tuple 1 | Index Tuple 2 | Index Tuple 3 | Index Tuple 4 | Index Tuple 5 | Index Tuple 6 |
|---|---|---|---|---|---|---|
| 1 | 9 | 9 | 9 | 15 | 23 | 23 |
| 2 | 0 | 0 | 0 | 81 | 4 | 4 |
| 3 | 17 | 234 | 234 | 16 | 16 | 18 |
| 4 | 512 | 82 | 82 | 5 | 5 | 5 |
| 5 = N | 6 | 6 | 20 | 112 | 112 | 25 |
| Non-Zero Value | V1 | V2 | V3 | V4 | V5 | V6 |

FIG. 7A

Mode 1 Computations: p = 1

| Buffer | During computations involving V2 | During computations involving V3 |
|---|---|---|
| p−1 | Does not exist | Does not exist |
| p = 1 | $A^{(1)}(9,:)$ | Need not reload |
| p+1 | $A^{(2)}(0,:)$ | Need not reload |
| p+2 | $A^{(3)}(0,:)*A^{(3)}(234,:)$ | Reusable (not used) |
| p+3 | Value (REUSED) from Buffer $(p+2)*A^{(4)}(82,:)$ | REUSE |
| p+4 = N | Value (REUSED) from Buffer $(p+3)*A^{(5)}(6,:)$ | Value (REUSED) from Buffer $(p+3)*A^{(5)}(20,:)$ |

FIG. 7B

Mode 2 Computations: p = 2

| Buffer | During computations involving V2 | During computations involving V3 |
|---|---|---|
| p−1 = 1 | $A^{(1)}(9,:)$ | Need not reload |
| p = 2 | $A^{(1)}(9,:)*A^{(2)}(0,:)$ | REUSE |
| p+1 | $A^{(3)}(234,:)$ | Need not reload |
| p+2 | $A^{(3)}(234,:)*A^{(4)}(82,:)$ | REUSE |
| p+3 = N | Value (REUSED) from Buffer $(p+2)*A^{(5)}(6,:)$ | Value (REUSED) from Buffer $(p+2)*A^{(5)}(20,:)$ |

FIG. 7C

Mode 3 Computations: p = 3

| Buffer | During computations involving V2 | During computations involving V3 | During computations involving V5 | During computations involving V6 |
|---|---|---|---|---|
| p−2 = 1 | $A^{(1)}(9,:)$ | Need not reload | $A^{(3)}(23,:)$ | Need not reload |
| p−1 | $A^{(1)}(9,:)*A^{(2)}(0,:)$ | REUSE | $A^{(3)}(23,:)*A^{(2)}(4,:)$ | REUSE |
| p = 3 | Value (REUSED) from Buffer $(p−1)*A^{(3)}(234,:)$ | REUSE | Value (REUSED) from Buffer $(p−1)*A^{(3)}(16,:)$ | Value (REUSED) from Buffer $(p−1)*A^{(3)}(18,:)$ |
| p+1 | $A^{(4)}(82,:)$ | Need not reload | $A^{(4)}(5,:)$ | Need not reload |
| p+2 = N | $A^{(4)}(82,:)*A^{(5)}(6,:)$ | Value (REUSED) from Buffer $(p+1)*A^{(5)}(20,:)$ | $A^{(4)}(5,:)*A^{(5)}(112,:)$ | Value (REUSED) from Buffer $(p+1)*A^{(5)}(25,:)$ |

FIG. 7D

SYSTEMS AND METHODS FOR MEMORY EFFICIENT PARALLEL TENSOR DECOMPOSITIONS

CROSS REFERENCE TO RELATED APPLICATIONS

This application claims benefit of priority to U.S. Provisional Patent Application Ser. No. 62/515,199 entitled "Memory Efficient Parallel Tensor Decompositions," filed on Jun. 5, 2017, the entire contents of which are incorporated herein by reference.

FIELD OF THE INVENTION

This disclosure generally relates to optimization of high-performance computing systems in terms of processor usage and memory usage and, in particular to performing these optimizations in the context of tensor operations.

BACKGROUND

Tensors, or multi-dimensional arrays, are a natural way of representing multi-aspect data. Tensor decompositions are increasingly becoming prominent as a powerful technique for extracting and explaining the semantic properties of data in real-world data analysis applications. Tensor decompositions have applications in a range of domains such as cybersecurity, geospatial intelligence, bioinformatics (e.g. genomics), finance, scientific computing, social network analysis, recommendation systems, and many others.

Data analysis through tensor decompositions involves intensive computations over large-scale irregular sparse data. Optimizing the execution of such data intensive computations is key to reducing the time-to-solution (or response time) in real-world data analysis applications. Additionally, the volume of data processed in critical applications is growing in size. This growth is adding complexity with respect to quicker turnaround and feasibility to handle large data, in data analysis.

As High Performance Computing (HPC) systems are increasingly used for data analysis applications, it is becoming increasingly important to optimize sparse tensor computations and execute them efficiently on modern and advanced HPC systems such as multi-core, many-core, and future deep memory hierarchy exascale systems. In addition to utilizing the large processing capability of HPC systems, it is crucial to improve memory performance (memory usage, communication, synchronization, memory reuse, and data locality) in HPC systems.

Below, we give some background information that can help to understand our techniques. We discuss the basic definitions and algorithms for tensor decompositions.

A tensor is a multi-dimensional array and the order of a tensor is the number of dimensions, also called modes, of the tensor. A tensor can be transformed into a matrix (i.e. matricized) by flattening it along any of its modes. The mode-n matricized form of a tensor $\chi$ is denoted by $X_{(n)}$.

There are two popular and prominent tensor decomposition techniques, namely, CANDECOMP/PARAFAC (CP) and Tucker decompositions. Three different CP decomposition algorithms that are useful in real-world applications are optimized in various embodiments, as discussed below. The CP decomposition decomposes a tensor into a sum of component rank-one tensors (a N-way tensor is called a rank-one tensor if it can be expressed as an outer product of N vectors). This is illustrated in FIG. 1A. FIG. 1B illustrates Tucker decomposition. The CP decomposition that factorizes an input tensor $\lambda$ of size $I_1 \times I_2 \times \ldots \times I_N$ into R components (with factor matrices $A^{(1)} \ldots A^{(N)}$ and weight vector $\Lambda$ is of the form:

$\chi = \sum_{r=1}^{R} \lambda_r a_r^{(1)} \circ \ldots \circ a_r^{(N)}$ where $a_r(n)$ represents the $r^{th}$ column of the factor matrix $A^{(n)}$ of size $I_n \times R$.

a) CP-ALS Algorithm: The widely used workhorse algorithm for CP decomposition is the alternating least squares (ALS) method (presented as Algorithm 1A in FIG. 2A).

b) CP-ALS-NN Algorithm: The algorithm for non-negative (NN) CP-ALS decomposition using multiplicative updates is similar to Algorithm 1, but differs only in the way the factor matrices are updated at each step (Line 6). Line 6 of CP-ALS-NN algorithm (presented as Algorithm 1B in FIG. 2B) looks like:

$$A^{(n)} = A^{(n)} * \frac{U}{A^{(n)}V}$$

c) CP-APR Algorithm: Chi and Kolda have developed an Alternate Poisson Regression (APR) fitting algorithm for non-negative CP tensor decomposition that is well-suited for modeling and analyzing sparse count data. The CP-APR algorithm described is presented as Algorithm 2 in FIG. 3.

The sparse computations that are computationally expensive in these algorithms (and that are optimized in various embodiments, as discussed below) include:

Sparse matricized tensor times Khatri-Rao product (MTTKRP) computation in CP-ALS and CP-ALS-NN algorithms: $U = {}^-X_{(n)}(\odot_{m \neq n} A^{(m)})$ Sparse Khatri-Rao product ($\Pi$) computation in CP-APR algorithm:
$\Pi = (\odot_{m \neq n} A^{(m)})^T$ Sparse $\Phi$ computation (a composite operation involving elementwise division, matrix multiplication, tensor vector product) in CP-APR algorithm: $\Phi = (X_{(n)} \oslash (A^{(n)} \Pi)) \Pi^T$. This computation can be called MTTKRP-$\Phi$.

There are several works that have focused on optimizing sparse MTTKRP for shared- and distributed-memory systems. However, we are not aware of any work on optimizing CP-APR, other than our previous work where, we presented a NUMA-aware low-overhead scheduler for load balancing sparse tensor operations. The embodiments described herein are complementary to our previous work.

Kolda et al. developed and delivered a MATLAB Tensor Toolbox that provides a broad range of tensor decomposition methods, but they generally cannot be used for HPC purposes. Plantenga and Kolda provide a C++ based Tensor Toolbox, but the tensor decomposition methods are not optimized for efficient parallel execution. Ravindran et al. presented an MTTKRP formulation for three-mode tensors that achieves computational savings but is restricted to three modes. Smith et al. provide a tool called SPLATT in which they have a high-performance MPI+OpenMP implementation of CP-ALS by optimizing sparse MTTKRP and other computations in CP-ALS. SPLATT does not support CP-APR or CP-ALS-NN. SPLATT uses a compressed sparse tensor data structure called "compressed sparse fiber" (CSF) to identify and eliminate redundancies (using the sparsity pattern of tensors) in MTTKRP computation.

Choi et al. (through their tool DFacTo) and Kaya et al. (through their tool HyperTensor) provide a distributed-memory MPI version of CP-ALS, but they also do not support CP-APR or CP-ALS-NN. Rolinger et al. performed an empirical evaluation of the performance of CP-ALS implementation of the different tools, namely, ENSIGN, SPLATT, and DFacTo, and presented the strengths and areas of improvement of each tool.

SUMMARY

In various embodiments, we present multiple optimizations for sparse tensor computations that are targeted towards faster and memory-efficient execution on HPC systems. We present a technique to significantly reduce memory usage in tensor decompositions through rematerialization of computations. This optimization is key to applying tensor decompositions for large problems that would be otherwise infeasible on an HPC multi-core system. We also present an approach for performing operation- and memory-efficient sparse tensor computations that broadly applies to three different CP tensor decomposition methods. Our approach exploits the redundancy in the non-zero structure of sparse tensors and reuses partial results in tensor computations with insignificant (e.g., less than 2%, 5%, 10%, etc.) memory overhead. Further, we introduce an optimization that fuses sparse tensor and matrix operations and enables increased thread-local computations, reduced synchronizations (and communications), and improved data locality and reuse.

Overall, the features of various embodiments can be summarized as:
1) Improvements to three different widely applicable CP tensor decomposition methods (and not just one particular method that is not necessarily useful for all applications) to increase the feasibility and breadth of application of tensor analysis; and
2) Improvements to reduce memory usage, synchronizations, and execution time of tensor decomposition methods, and to enable the use of powerful tensor decomposition methods in critical real-world applications across multiple domains;

We also demonstrate how our improvements benefit tensor analysis of datasets from cybersecurity, geospatial intelligence, bioinformatics, Natural Language Processing (NLP), and social network domains.

Accordingly, in one aspect a method is provided for minimizing memory usage and/or processor usage while processing a tensor having N modes, wherein N≥3. The method includes the steps of: selecting a pair of first and second index tuples, each having N indices, in a selected mode order, where each index tuple identifies a respective non-zero tensor element, and identifying a first sub-tuple of one or more indices common to both the first and second index tuples. The method also includes allocating memory space for at least one partition in a partitioned buffer space having three partitions. The three partitions include: (i) a first partition having one buffer corresponding to a selected tensor mode (p); (ii) a second partition having at least one buffer corresponding to one or more tensor modes lower than the selected mode in the mode order; and (iii) a third partition having at least one buffer corresponding to one or more tensor modes higher than the selected mode in the mode order. Not all partitions may be present in a particular partitioned buffer space.

In addition, the method includes storing in the partitioned buffer space a set of partial results obtained from a first set of computations corresponding to the first index tuple. Moreover, in performing a second set of computations corresponding to the second index tuple, the method includes accessing and reusing, using the first sub-tuple, a first partial result from one of the partitions of the partitioned buffer space. This can minimize processor usage in performing the second set of computations, and/or the overall memory usage.

In some embodiments, identifying the first sub-tuple includes identifying a first sequence of one or more indices in the mode order and common to both the first and second index tuples. The first sequence includes an index corresponding to a first start mode and an index corresponding to a first end mode, and each index in the mode order from the first start index to the first end index. The first end mode can be the same as the first start mode.

The method may further include identifying a second sub-tuple by identifying a second sequence of one or more indices in the mode order and common to both the first and second index tuples. The second sequence may include an index corresponding to a second start mode and an index corresponding to a second end mode, and each index in the mode order from the second start index to the second end index. The second end mode can be the same as the second start mode. Furthermore, in performing the second set of computations, the method may include accessing and reusing, using the second sub-tuple, a second partial result from one of the partitions of the partitioned buffer space. This can further minimizing the processor usage in performing the second set of computations and/or the overall memory usage. The first partial result and the second partial result may be accessed from two different partitions.

In some embodiments, the first set of computations includes a first computation and a second computation. A partial result of the first computation is stored in the partitioned buffer space and reused in the second computation, and a partial result of the second computation is stored in the partitioned buffer space. The first partial result may include either the partial result of the first computation or the partial result of the second computation.

In some embodiments, the second set of computations includes a first computation, and the first partial result is designated as a result of the first computation without performing that computation. The second set of computations may include a second computation that is performed using the result of the first computation. The method may include performing the second computation, and storing a result of the second computation in the partitioned buffer space in a buffer associated with an index higher in the mode order than a highest index in the first sub-tuple.

In some embodiments, the buffer spaces includes at most N buffers. The size of each buffer (e.g., in memory bytes, words, etc.) is equal to a rank of the tensor, which bounds a memory size of the buffer space to at most to N times the rank of the tensor. The memory size is thus independent of both a size of the tensor and a number of non-zero elements in the tensor.

In some embodiments, each of the first and second sets of computations includes modified CANDECOMP/PARAFAC (CP) tensor decomposition computations. The modification includes eliminating storage of a partial result of a matrix operation, where the result has a size proportional to a number of non-zero elements in the tensors times a rank of the tensor. This can reduce the overall memory usage of the computations. The modification also includes repeating a matrix operation included in the CP tensor decomposition at least once.

In some embodiments, each of the selecting, identifying, storing, and accessing and reusing steps, but not the allocating step, is iterated for each mode of the tensor. In each iteration, a mode corresponding to that iteration is designated as the selected mode. The iterations thus configured can minimize processor usage while bounding memory usage across all iterations. The mode order may be selected based on respective sizes of each mode. In some embodiments, all index tuples corresponding to the non-zero tensor elements are hierarchically sorted according to indices of modes from a start mode of the mode order to an end mode of the mode order.

In some embodiments, the method further includes distributing the computations associated with the tensor across two or more processors. The distribution may be based on, at least in part, a number of non-zero elements in the tensor. The method may also include identifying at least two groups of indices of the first mode in the mode order from the index tuples corresponding to the non-zero tensor elements, where: in a first group, a particular first mode index is associated with more index tuples than any other first mode index in the first group. In these embodiments, the distribution is further based on, at least in part, the groups of first mode indices.

In some embodiments, indices of the first mode in the first group are different from indices of the first mode in a second group. Computations associated with the first group are allocated to a first processor, computations associated with the second group are allocated to a different, second processor. The computations may include computing a first partial result and revising a second partial result. The method may include merging by at least one of the first and second processors the respective revising of the second partial result with the respective computing of the first partial result.

In some embodiments, an index of the first mode is common to both the first group and a second group. Computations associated with the first group are allocated to a first processor, and computations associated with the second group are allocated to a different, second processor. The computations may include computing a first partial result and revising a second partial result. To this end, the method may include adding respective results obtained from the first and second processors to obtain the first partial result, and subsequent to adding, revising the second partial result.

In another aspect, a system is provided for minimizing memory usage and/or processor usage while processing a tensor having N modes, wherein $N \geq 3$. The system includes a first processor and a first memory in electrical communication with the first processor. The first memory includes instructions that can be executed by a first processing unit including the first processor or a second processor, or both. The first processing unit may be in electronic communication with a memory module that includes the first memory or a second memory or both.

The instructions in the first memory program the first processing unit to: select a pair of first and second index tuples, each having N indices, in a selected mode order, where each index tuple identifies a respective non-zero tensor element. The instructions also program the first processing unit to identify a first sub-tuple of one or more indices common to both the first and second index tuples, and to allocate memory space for at least one partition in a partitioned buffer space. The partitioned buffer space has three partitions including: (i) a first partition having one buffer corresponding to a selected tensor mode (p); (ii) a second partition having at least one buffer corresponding to one or more tensor modes lower than the selected mode in the mode order; and (iii) a third partition having at least one buffer corresponding to one or more tensor modes higher than the selected mode in the mode order. Not all partitions may be present in a particular partitioned buffer space.

In addition, the instructions program the first processing unit to store in the partitioned buffer space a set of partial results obtained from a first set of computations corresponding to the first index tuple. Moreover, in performing a second set of computations corresponding to the second index tuple, the instructions program the first processing unit to access and reuse, using the first sub-tuple, a first partial result from one of the partitions of the partitioned buffer space. This can minimize usage of the first processing unit in performing the second set of computations, and/or the overall memory usage. In various embodiments, the instructions can program the first processing unit to perform one or more of the method steps described above.

In another aspect, an article of manufacture is provided for minimizing memory usage and/or processor usage while processing a tensor having N modes, wherein $N \geq 3$. The article of manufacture includes a non-transitory storage medium having stored therein instructions which, when executed by a first processing unit program the first processing unit, which is in electronic communication with a memory module, to: select a pair of first and second index tuples, each having N indices, in a selected mode order, where each index tuple identifies a respective non-zero tensor element. The instructions also program the first processing unit to identify a first sub-tuple of one or more indices common to both the first and second index tuples, and to allocate memory space for at least one partition in a partitioned buffer space. The partitioned buffer space has three partitions including: (i) a first partition having one buffer corresponding to a selected tensor mode (p); (ii) a second partition having at least one buffer corresponding to one or more tensor modes lower than the selected mode in the mode order; and (iii) a third partition having at least one buffer corresponding to one or more tensor modes higher than the selected mode in the mode order. Not all partitions may be present in a particular partitioned buffer space.

In addition, the instructions program the first processing unit to store in the partitioned buffer space a set of partial results obtained from a first set of computations corresponding to the first index tuple. Moreover, in performing a second set of computations corresponding to the second index tuple, the instructions program the first processing unit to access and reuse, using the first sub-tuple, a first partial result from one of the partitions of the partitioned buffer space. This can minimize usage of the first processing unit in performing the second set of computations, and/or the overall memory usage. In various embodiments, the instructions can program the first processing unit to perform one or more of the method steps described above.

BRIEF DESCRIPTION OF THE DRAWINGS

In the following description, various embodiments of the present invention are described with reference to the following drawings, in which:

FIGS. 2A and 2B depict the CP-ALS and CP-ALS-NN algorithms, respectively;

FIG. 3 depicts the CP-APR algorithm;

FIGS. 4A and 4B depict a modification of the CP-APR algorithm, and the modified CP-APR algorithm, according to various embodiments;

FIG. 6 depicts a further modification of the modified CP-APR algorithm, according to some embodiments;

FIGS. 7A-D schematically depict another example tensor having certain non-zero values, the corresponding index tuples, the overlap in indices, a buffer space, and the reuse of partial results, according to some embodiments;

DETAILED DESCRIPTION

We present a detailed description of our approach in which we develop multiple optimizations aimed at improving the performance in terms of execution time and memory usage of tensor decompositions. For further discussion, assume that a sparse tensor that is decomposed by the existing and optimized tensor decomposition methods (that we focus in this paper) has N modes and P non-zero values. Let the size of the tensor be $I_1 \times I_2 \times \ldots \times I_N$. Let the tensor be decomposed into R components. A non-zero value, in general, is a value that is not zero. Non-zero values also includes values that are larger in magnitude (i.e., regardless of the sign) than a specified threshold, e.g., greater than 0.001, 0.05, 0.2, 1.6, 4.5, etc. The threshold can be specified as a percentage of a certain value in the tensor, e.g., as 10%, 5%, 2%, 1%, or less, of the maximum, mean, or median value in the tensor.

We also observe that in the sparse version of a Khatri-Rao product (KRP) of M matrices $A^{(1)}, \ldots, A^{(M)}$, the size of the $n^{th}$ matrix being $I_n \times R$, $1 \leq n \leq M$), we need not compute all the $\Pi_{n=1}^{N} I_n$ rows but only certain number of rows driven by the non-zero structure (number of non-zeros, say P, and list of non-zero indices) of a sparse tensor along which the KRP is used in other computations in the decomposition method. Hence, sparse KRP computation involves only a selected number of rows, usually, one per non-zero of the sparse tensor involved in the decomposition. Each row of the sparse KRP is given by the elementwise product (also called the Hadamard product) of the rows of the matrix selected by the index of the non-zero tensor element. If the p-th non-zero index of the tensor is $(i_1, \ldots, i_M)$ then the p-th row of sparse KRP is given by:

$$\Pi(p,:) = A^{(1)}(i_1,:) * \ldots * A^{(M)}(i_M,:)$$

Selective Rematerialization of Sparse Khatri-Rao Product

A critical challenge in scaling and applying the CP-APR method for tensor analysis is addressing the memory blowup problem. The matrix $\Pi$, storing the result of sparse KRP, that is computed in Line 4 of Algorithm 2 is of size P×R. Since $\Pi$ is reused in the "inner iterative loop" starting in Line 5 of Algorithm 2, the existing state-of-the-art implementation of CP-APR computes $\Pi$ as a full P×R matrix. If the tensor is large (which typically means that P is large) or if the tensor is decomposed into very high number of components (in other words, if R is large), this adds a huge memory pressure or makes it infeasible to perform the tensor decomposition.

Figure 1A:
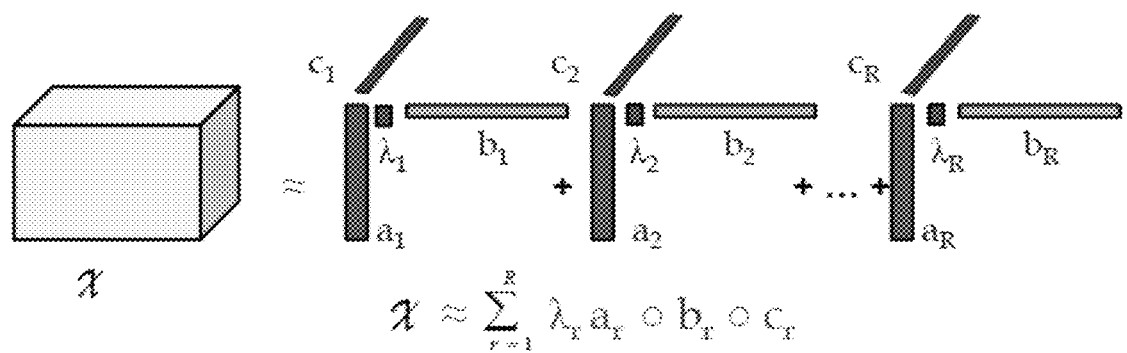
FIGS. 1A and 1B schematically illustrate conventional CP and Tucker decomposition techniques, respectively.
Figure 1B:
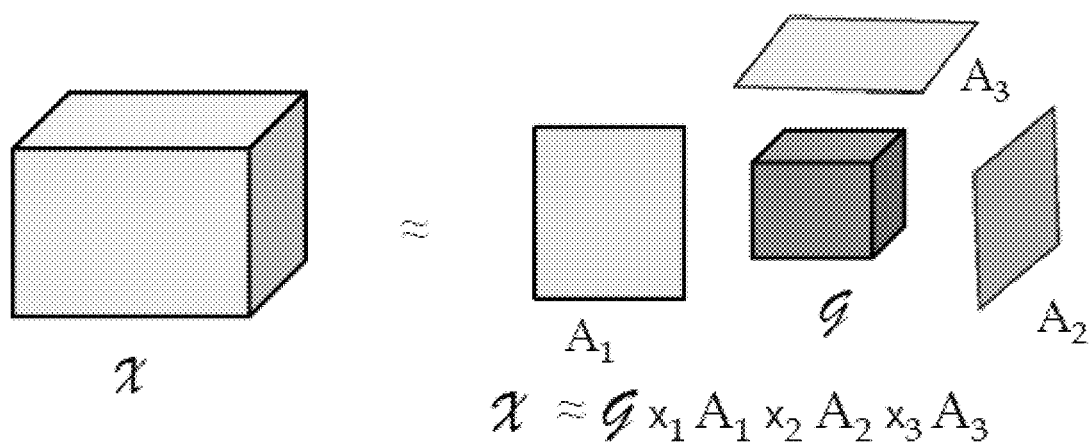
Figure 4A:
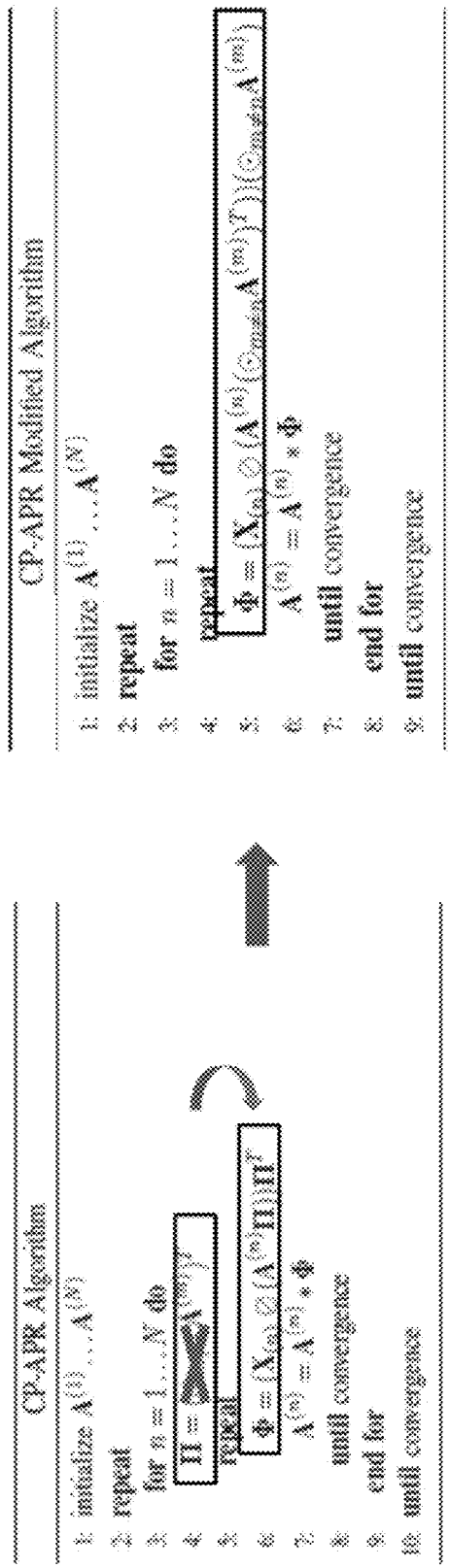

In some embodiments, our solution to address this problem is highly counter-intuitive. A typical optimization involves hoisting operations that do not change in loop iterations outside of the loop (or loop nest). We do the opposite, and fold in the computation of $\Pi$ into the inner iterative loop and recompute the rows of $\Pi$ as they are needed in the computation of $\Phi$ (Line 6 of Algorithm 2). This is shown in FIG. 4A. While this can increase some computation overhead, in various embodiments, the folding results in significant (on the order P×R) savings in memory usage. Typically, the number of non-zero tensor elements P can be a few hundreds, thousands, tens or hundreds of thousands, a few, tens, or hundreds of millions, or more, and the tensor rank R can be can be a few tens, hundreds, thousands, tens or hundreds of thousands, a few millions, or more. We call this "selective rematerialization" of sparse KRP. As a result, in Algorithm 2, Line 4 is (removed and) folded into Line 6, and Line 6 becomes:

$$\Phi = (X_{(n)} \oslash (A^{(n)} (\sqcup_{m=n} A^{(m)})^T))(\sqcup_{m=n} A^{(m)}) \quad (1)$$

The modified CP-APR algorithm is shown as Algorithm 3 in FIG. 4B. Selective rematerialization (or recomputation) of rows of sparse KRP decreases memory pressure and memory usage from O(PR) to O(P). However, it increases the amount of computations that are performed in the $\Phi$ computation. The computation of $\Phi$ is the most computationally expensive step (O(PR) for each inner iteration) in CP-APR and it becomes even more expensive (O(PNR) for each inner iteration) with the rematerialization of $\Pi$. We describe below an optimization in which we exploit the redundancy in the non-zero structure (i.e. redundancy of tensor indices) of the sparse tensor and optimize the unified computation of $\Pi$ and $\Phi$ described in Equation 1.

Exploiting the Redundancy in Non-Zero Structure of Tensors

Sparse tensors are usually represented as a list of values and multi-indices (called the "coordinate format" of sparse tensors). There is a lot of redundancy in the tensor indices since tensor entries have common sub-indices. For example, if ((1, 1, 1), 5.0) and ((1, 1, 2), 5.2) are two tensor entries in a sparse tensor, they have common sub-indices (1, 1) in the first two modes. The MSS and MGS sparse tensor formats can exploit this redundancy and provide a compressed tensor storage. We now discuss how we exploit the redundancy in non-zero structure (even without MGS and MSS data structures, though any of these two structures can be used for further optimizations) and eliminate redundant computations through reuse of partial results from common sub-expressions (with insignificant memory overhead) in tensor decompositions, especially, computations involving sparse KRP.

Recall that we compute P rows of sparse KRP corresponding to P non-zeros of the sparse tensor and row p $(1 \leq p \leq P)$ of sparse KRP is given by the elementwise (Hadamard) product of the rows of the matrix selected by the index of the p-th non-zero. We now discuss how we perform the "computation-minimal" unified and rematerialized $\Pi$ and $\Phi$ computation in the modified CP-APR algorithm.

Figure 5:
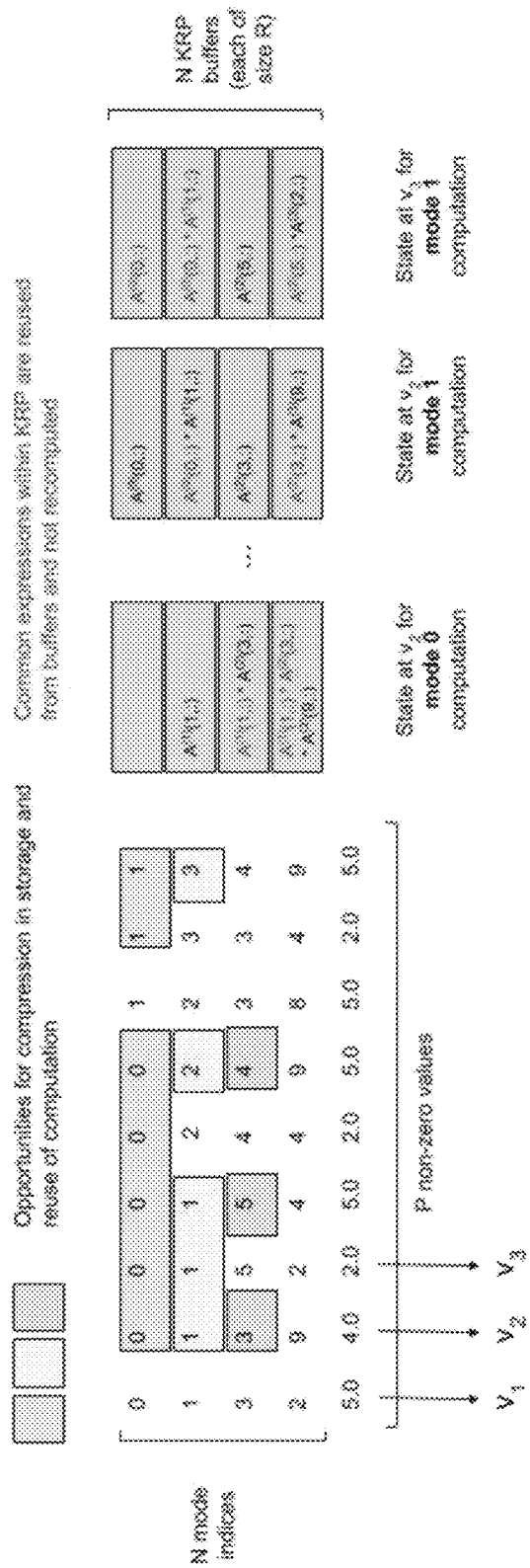
FIG. 5 schematically depicts an example tensor having certain non-zero values, the corresponding index tuples, the overlap in indices, a buffer space, and the reuse of partial results, according to some embodiments.

FIG. 5 illustrates our approach according to some embodiments to eliminate one or more redundant computations in sparse KRP operation. We use N KRP buffers each of size R, one corresponding to each mode. For large tensors, the amount of computation savings achieved from this optimization outweighs the O(NR) memory overhead introduced for the buffers. With the MSS and MGS tensor data structures, the indices may be ordered such that consecutive non-zeros have common sub-indices as much as possible (with the indices diverging from the innermost mode to the outermost mode along the list of non-zeros) as illustrated in FIG. 5. This enables reuse of partial results in the computation of sparse KRP.

In FIG. 5, an example tensor has four modes (denoted mode 0, 1, 2, and 3). The modes can also be labeled starting from mode 1. The indices for the first three modes of the non-zero values (V1=5.0) and (V2=4.0) are the same. These common indices are $\{0, 1, 3\}$. For mode 3, the indices are different; they are 2 and 9, respectively. The values (V3=2.0) and V2 (and also V1) share two common indices for modes 0 and 1. FIG. 5 also depicts additions non-zero values that have some indices that are the same as one or more indices of other non-zero values.

In performing computations for mode 0, various values are computed and stored in a buffer space as FIG. 5 illustrates. In particular, in performing computations corresponding to the first index tuple $\{0, 1, 3, 2\}$, a row vector $A^{(1)}(1,:)$ is loaded and stored in a buffer corresponding to mode 1. In computing the value $A^{(1)}(1,:)*A^{(2)}(3,:)$ that is to be stored in the buffer corresponding to mode 2, the value $A^{(1)}(1,:)$ that is already stored in the buffer corresponding to mode 1 is not loaded again, minimizing access to global memory, and is reused. The stored partial result (i.e., $A^{(1)}(1,:)*A^{(2)}(3,:)$) is then reused in computing $A^{(1)}(1,:)*A^{(2)}(3,:)*A^{(3)}(2,:)$, which is stored in the buffer corresponding to mode 3 (not shown). In performing computations corresponding to the next index tuple $\{0, 1, 3, 9\}$, some of the values already stored in some of the buffers are reused. For example, The partial result that was stored previously in the buffer corresponding to mode 2 (i.e., $A^{(1)}(1,:)*A^{(2)}(3,:)$) is reused in computing $A^{(1)}(1,:)*A^{(2)}(3,:)*A^{(3)}(9,:)$, which is stored in the buffer corresponding to mode 3.

In computing values for mode 1, further reuse is achieved. For example, in performing computations for V1, a partial result $A^{(0)}(0,:)*A^{(1)}(1,:)$ is stored in the buffer corresponding to mode 1, and this partial result is simply reused in performing the computations for V2 and V3. The partial results relevant to the computations associated with a particular non-zero tensor value may also be reused. For example, in the computations for V2, $A^{(2)}(3,:)$ that was loaded and stored in the buffer corresponding to mode 2 may be reused in computing the partial result $A^{(2)}(3,:)*A^{(3)}(9,:)$ that would be stored in the buffer corresponding to mode 3. Likewise, in the computations for V3, $A^{(2)}(5,:)$ that was loaded and stored in the buffer corresponding to mode 2 may be reused in computing the partial result $A^{(2)}(5,:)*A^{(3)}(2,:)$ that would be stored in the buffer corresponding to mode 3.

Algorithm 4 shown in FIG. 6 presents the computation-minimal unified computation of $\Phi$ and $\Pi$ (i.e. optimized version of Line 6 in Algorithm 2 after it is modified as per Equation 1). It assumes the following: S stores the indices of the sparse tensor, v stores the values of the tensor, and K is the N×R KRP buffer matrix. It reduces the complexity of computation from O(PNR) for each inner iteration to O(PN$_r$R) for each inner iteration, where N$_r$=$\psi_r$N, 0<$\psi_r$≤1, and $\psi_r$ represents the redundancy factor inherent in the structure of the non-zero tensor elements. An important observation is that changing Line 7 to w=1 in Algorithm 4 makes it computation-minimal sparse MTTKRP (i.e. optimized version of Line 5 in Algorithm 1) for CP-ALS and CP-ALS-NN.

Fusion of Sparse Tensor and Matrix Operations

It is extremely important to exploit the large processing capability (improve concurrency and load balance) and memory hierarchy (increase accesses to faster memory and reduce data movement) in modern and advanced HPC systems such as multi-core, many-core, and deep hierarchy exascale systems. Towards this objective, we present a technique that (1) increases thread-local computations and exploits parallelism, (2) reduces synchronizations and communications, and (3) improves data locality and reuse.

Our approach is to efficiently and carefully fuse the sparse tensor and matrix operations such that a processing thread performs more local computations and less synchronizations (global or point-wise) and brings the consumption of results of fused composite operations closer to their production.

In some implementations of the CP-APR algorithm, we fold Line 4 into Line 6 (because of rematerialization described above) and fuse Lines 6 (that is optimized as also described above) and 7 into one composite operation. Similarly, for CP-ALS (and CP-ALS-NN), in some implementations we fuse Lines 5 (that is optimized as described above) and 6 in Algorithm 1 into one composite operation.

Without the fusion of operations described in our approach, each operation will be "individually" optimized and parallelized (for example using OpenMP parallel construct), with synchronizations between the individual parallelized operations. If the pattern of distribution of computations across processor cores is different across the operations, then it would also make the processing thread access non-local data resulting from the previous operation.

With reference to FIGS. 7A-D, the index tuples corresponding to the non-zero values of a tensor X are shown. Specifically, the tensor X has five modes, i.e., N=5, and the tensor X includes six non-zero values V1 through V6. Without loss of generality, the mode order selected in this example is mode 1 through mode 5. It should be understood that this is example is illustrative only and that in general a tensor can have as few as three modes, but would typically have many modes (e.g., 8, 20, 100, or more), and would typically include many more than six (e.g., a few tens, hundreds, thousands, hundreds of thousands, millions, tens of millions, hundreds of millions, or more) non-zero values. Similarly, any other mode order can be selected.

In general, the size of a tensor along a particular dimension or mode p can be denoted $I_p$, where $I_p$≥1. In general, $I_p$ a few tens, hundreds, thousands, hundreds of thousands, millions, tens of millions, etc.). A particular tuple $\{i_1, i_2, \ldots, i_N\}$ identifies a particular value, which can be zero or non-zero, of an index. For example, in a 3×5 matrix Q, the pair $\{1,1\}$ identifies an element in the first row and the first column and the pair $\{3,2\}$ identifies an element in the third row and the second column. Likewise, in a tensor T of dimensions $(I_1 \times I_2 \times \ldots \times I_N)$, the index tuple $\{x_1, x_2, \ldots, x_N\}$ identifies an element at the location determined by the combination of locations: $x_1$ in mode 1, $x_2$ in mode 2, $\ldots$, $x_N$ in mode N, and the index tuple $\{y_1, y_2, \ldots, y_N\}$ identifies an element at the location determined by the combination of locations: $y_1$ in mode 1, $y_2$ in mode 2, $\ldots$, $y_N$ in mode N. For each $x_p$ and $y_p$, where p∈[1,N], $x_p$, $y_p$∈[1, $I_p$]. In some cases, the index range may start from zero, where $x_p$, $y_p$∈[0,($I_p$−1)]. Thus, an index tuple specifies not the value of a tensor element but the address or location of a tensor element. In the example described in FIGS. 7A-D, Index Tuple 1 $\{9, 0, 17, 512, 6\}$ specifies the location of and thus identifies the non-zero value V1; Index Tuple 1 $\{9, 0, 234, 82, 6\}$ specifies the location of and thus identifies the non-zero value V2, and so on.

FIGS. 7A-D also describe the buffer space and its use during the computations performed according to various embodiments. In general, the buffer space includes N (5 in this example) buffers. The size of each buffer is R words of memory, where R is the rank of the tensor X. This space is allocated when the computations are initiated for the first index tuple in the first mode that is selected for processing. Once allocated, the buffer space is reused from the computations of one index tuple to the next and from the computations for one mode to the next. In other words, a new buffer space is not allocated for the computation of each new index tuple and/or during the computations associated with each new mode that is selected, allowing bounding the total memory used for the buffer space to no more than the number of modes N times the rank of the tensor R.

The mode order selected to analyze the overlap between the index tuples is 1 through 5. As noted above, another mode order can be selected. In general, the computations are performed for all modes. The order in which modes are selected for iterations through all the modes can be the same as the mode order used to analyze the tuple overlap, or a different order can be selected. In this example, we discuss the iterations corresponding to modes 1, 2, and 3. For simplicity of discussion, the usage of the buffer space during the computations associated with Index Tuple 1 are not discussed. In each mode-level iteration, some of the values that are stored in the buffer space during the computations associated with Index Tuple 1 may be reused while performing computations associated with other index tuples. For simplicity of discussion, we ignore such reuse in the discussion below.

In mode 1 (denoted p=1) computations, the buffer space is partitioned into two partitions: A partition having one buffer corresponding to mode p=1; and a second partition corresponding to the higher modes, i.e., modes p+1=2 through p+3=5=N. In the computation of Index Tuple 2, the value stored in the buffer corresponding to p=1 (i.e., mode 1) is the row 9 of the factor matrix $A^{(1)}$, denoted $A^{(1)}(9,:)$. This value may have been loaded and stored during the computations associated with Index Tuple 1. But, as noted above, we ignore such reuse in this discussion, for simplicity of discussion. Continuing with the computations of Index Tuple 2, the value stored in the buffer corresponding to p+1 (mode 2) is the row 0 of the factor matrix $A^{(2)}$, denoted $A^{(2)}(0,:)$.

The value stored in the buffer corresponding to p+2 (mode 3) is the partial result in the overall computations, i.e., the result of a particular matrix operation (e.g., elementwise product of matrix rows in a Khatri-Rao product of matrices) $(A^{(2)}(0,:)*A^{(3)}(234,:))$, where $A^{(3)}(234,:)$ is the row 234 of the factor matrix $A^{(3)}$. The size of this product is R, where R is the rank of the tensor X. This value is reused while computing the value to be stored in the buffer corresponding to p+3 (mode 4), which is another partial result in the overall computations, i.e., the result of a particular matrix operation $(A^{(2)}(0,:)*A^{(3)}(234,:)*A^{(4)}(82,:))$. Rather than performing the product just described, a product between: (i) a value already stored in the buffer corresponding to p+2 (mode 3) and (ii) $A^{(4)}(82,:)$ is performed and the result of this product is stored in the buffer corresponding to p+3 (mode 4). This reuse can avoid a part of the computations associated with this buffer.

The value stored in the buffer corresponding to p+3 (mode 4) is reused while computing the value to be stored in the buffer corresponding to p+4 (mode 5), which is yet another partial result in the overall computations, i.e., the result of a particular matrix operation $(A^{(2)}(0,:)*A^{(3)}(234,:)*A^{(4)}(82,:)$ *$A^{(5)}(6,:))$. Here again, rather than performing the product just described, a product between: (i) a value already stored in the buffer corresponding to p+3 (mode 4) and (ii) $A^{(5)}(6,:)$ is performed and the result of this product is stored in the buffer corresponding to p+4 (mode 5). This reuse can further avoid a part of the computations associated with this buffer and, in general, the computations associated with the Index Tuple 2.

Now turning to Index Tuple 3, it can be seen that Index Tuples 2 and 3 include a common sub-tuple {9, 0, 234, 82}. In this sub-tuple, the start mode is 1 and the end mode is 4. For each of the modes from start (1) to end (4), the respective index values between Index Tuple 2 and Index Tuple 3, i.e., 9, 0, 234, and 82, are identical. This common sub-tuple enables reuse, during the computations associated with Index Tuple 3, of some of the values computed and already stored during the computations associated with the Index Tuple 2. Specifically, during the computations associated with Index Tuple 3, the buffer corresponding to p=1 (mode 1) needs the value $A^{(1)}(9,:)$ and, as such, this value is not reloaded; it is in the buffer already. Likewise, the buffer corresponding to p+1 (mode 2) needs the value $A^{(2)}(0,:)$ and, as such, this value is not reloaded.

The buffer corresponding to p+2 (mode 3) already has the value $(A^{(2)}(0,:)*A^{(3)}(234,:))$ stored therein and this value is reusable. Specifically, the computation for the buffer corresponding to p+3 (mode 4) during computations for the Index Tuple 3 is $(A^{(2)}(0,:)*A^{(3)}(234,:)*A^{(4)}(82,:))$. This computation can reuse the partial result $(A^{(2)}(0,:)*A^{(3)}(234,:))$, which is already stored in the buffer corresponding to p+2 (mode 3). But the fact that the end mode of the sub-tuple is not mode 3 informs the process that further reuse is available. In particular, the value $(A^{(2)}(0,:)*A^{(3)}(234,:)*A^{(4)}(82,:))$ itself is already stored in the buffer corresponding to p+3 (mode 4). Therefore, the value in this buffer can be reused directly, as is, without needing any additional computations in connections with this buffer.

The end mode of the sub-tuple is 4, which informs the process that full reuse is not available for the next mode, i.e., mode 5. The partial result in the overall computations that is to be computed for storage in the buffer corresponding to p+4 (mode 5) is $(A^{(2)}(0,:)*A^{(3)}(234,:)*A^{(4)}(82,:)*A^{(5)}(20,:))$. The indices of Tuples 2 and 3 for mode 5 are different; they are 6 and 20, respectively. As such, the value already stored in the buffer corresponding to p+4 (mode 5) cannot be reused. The value stored in the buffer corresponding to p+3 (mode 4) can be reused, however. In particular, rather than performing the product just described, a product between: (i) a value already stored in the buffer corresponding to p+3 (mode 4) and (ii) $A^{(5)}(20,:)$ is performed and the result of this product is stored in the buffer corresponding to p+4 (mode 5), which is the buffer corresponding to the mode immediately following the end mode of the sub-tuple. This reuse can avoid a part of the computations associated with this buffer and, in general, the computations associated with the Index Tuple 2. In general, during the computations for a current index tuple, reuse of already stored values that were computed for a previous index tuple is possible up to the end mode of the sub-tuple that is common to the previous and current tuples. A new value must be computed for the one or more modes following the end mode of the sub-tuple.

FIGS. 7A-D illustrate a similar reuse when mode 2 is selected, i.e., p=2. Here, the buffer space is divided into three partitions: a partition corresponding to mode 1, which is lower than the selected mode; a partition corresponding to mode 2, which is the selected mode; and a partition corresponding to modes 3 through 5, which are higher than the selected mode. Specifically, during the computations for Index Tuple 2, the value stored in the buffer corresponding to p+2 (mode 4) is reused in performing computations for the buffer corresponding to p+3 (mode 5). In other words, rather than computing $(A^{(3)}(234,:)*A^{(4)}(82,:)*A^{(5)}(6,:))$, a product between: (i) a value already stored in the buffer corresponding to p+2 (mode 4) (i.e., $(A^{(3)}(234,:)*A^{(4)}(82,:))$, and (ii) $A^{(5)}(6,:)$ is performed and the result of this product is stored in the buffer corresponding to p+3 (mode 5).

During the computations for Index Tuple 3, the value in the buffer in Partition #2, i.e., the value in the buffer corresponding to p=2 (mode 2) is reused as is. No computations need to be performed in connection with this buffer. Likewise, the value in the buffer in Partition #3, i.e., the value in the buffer corresponding to p+2 (mode 4) is reused as is. No computations need to be performed in connection with this buffer, as well. Finally, the value in the buffer corresponding to p+2 (mode 4) is also reused to compute the value to be stored in the buffer corresponding to p+3 (mode 5). In particular, rather than computing $(A^{(3)}(234,:)*A^{(4)}(82,:)*A^{(5)}(20,:))$, a product between: (i) a value already stored in the buffer corresponding to p+2 (mode 4) (i.e., $(A^{(3)}(234,:)*A^{(4)}(82,:))$, and (ii) $A^{(5)}(20,:)$ is performed and the result of this product is stored in the buffer corresponding to p+3 (mode 5). These reuses can avoid a part of the computations associated with the Index Tuple 3 that are to be performed during the iteration for mode 2.

FIGS. 7A-D further illustrate a similar reuse when mode 3 is selected, i.e., p=3. Here again, the buffer space is divided into three partitions, but the partitions are: a partition corresponding to modes 1 and 2, which are lower than the selected mode; a partition corresponding to mode 3, which is the selected mode; and a partition corresponding to modes 4 and 5, which are higher than the selected mode.

During the computations for Index Tuple 2, the value stored in the buffer corresponding to p−1 (mode 2), a buffer in Partition #1 is reused in performing computations for the buffer corresponding to p=3 (mode 3). During the computations for Index Tuple 2, the value in the buffer corresponding to p−1 (mode 2) is reused as is. No computations need to be performed in connection with this buffer. Likewise, the value in the buffer in Partition #2, i.e., the value in the buffer corresponding to p=3 (mode 3) is reused as is. No computations need to be performed in connection with this buffer, as well. Finally, a value in a buffer in Partition #3, i.e., the value in the buffer corresponding to p+1 (mode 4) is also reused, without loading it again, to compute the value $(A^{(4)}(82,:)*A^{(5)}(20,:))$ to be stored in the buffer corresponding to p+2 (mode 5).

A different reuse is possible during the computations associated with Index Tuple 5 and Index Tuple 6. Here, the common sub-tuple has a start mode 1 and end mode 2, having respective indices 23 and 4. In general, a sub-tuple can have just a single common index, where the start mode and the end mode are the same. During the computations associated with Index Tuple 5, a buffer in Partition #1 is reused in performing computations for the buffer corresponding to p=3 (mode 3). Specifically, a value $(A^{(1)}(23,:)*A^{(2)}(4,:))$, that is already stored in the buffer corresponding to p−1 (mode 2) is reused in computing $(A^{(1)}(23,:)*A^{(2)}(4,:)*A^{(3)}(1,:))$, i.e., the value to be stored in the buffer corresponding to p=3 (mode 3). During the computations associated with Index Tuple 6, the value already stored in the buffer corresponding to p−1 (mode 2) while performing the computations for Index Tuple 5 is reused, and the computations associated with this buffer for Index Tuple 6 are avoided entirely. Finally, a value in a buffer in Partition #3, i.e., the value in the buffer corresponding to p+1 (mode 4) is reused, without loading it again, to compute the value $(A^{(4)}(5,:)*A^{(5)}(25,:))$ to be stored in the buffer corresponding to p+2 (mode 5). These reuses can avoid a part of the computations associated with various index tuples that are to be performed during the iteration for mode 3.

While the discussion above describes reuse within the computations associated with the same index tuple, and between the computations associated with two adjacent index tuples, this is not a limitation. In general, one or more values stored after performing computations associated with one index tuple can be reused in performing the computations associated with one or more other adjacent and/or non-adjacent index tuples.

In performing computations for a particular mode p, the MTTKRP-Φ computation that is discussed with reference to FIGS. 7A-D, uses the values of the factor matrix $A^{(p)}$. The MTTKRP computation that may be used in the conventional CP-ALS an CP-ALS-NN algorithms (shown in FIGS. 2A and 2B) does not use the factor matrix $A^{(p)}$. Nevertheless, reuse using the techniques described above can be performed in a straightforward manner in the MTTKRP computation, as well. In that case, the buffer corresponding to mode p in the iteration for mode p will be empty, and no computations corresponding to that buffer would be performed. The partial results to be computed and stored, and reused when possible, for all other buffers, as described above.

In some embodiments, the various operations associated with a tensor can be parallelized and distributed across two or more processors, processor cores, etc. Referring again to FIG. 7A, in one embodiment, the computations associated with Tuples 1 and 2 are assigned to processor A, those associated with Tuples 3 and 4 are assigned to processor B, and those associated with Tuples 5 and 6 are assigned to processor C. It should be understood that this distribution is illustrative and that the number of Tuples associated with each processor need not be the same as in this example.

In the foregoing example, the computations corresponding to mode 1, index 9 are performed by two processors (processors A and B) and, as such, the partial results of these operations must be combined, e.g., via matrix addition, to obtain a complete partial result for mode 1, index 9. The complete partial result may be denoted $\Phi^{(1)}(9,:)$. Processor B can compute the complete partial result $\Phi(15,:)$ by itself, i.e., without having to combine partial results from another processor and, likewise, processor C can compute the complete partial result $\Phi^{(1)}(23,:)$, by itself.

According to Algorithm 3 (shown in FIG. 4B), line 6 computes the factor matrix $A^{(n)}$ using Φ. In some embodiments, taking advantage of the fact that one or more partial results $\Phi^{(p)}(k,:)$ for the p-th mode index k can be computed independently by a certain processor, the subsequent computation of $A^{(p)}(k,:)$ is merged with the computation of $\Phi^{(p)}(k,:)$. The values are corresponding to the different mode-p indices, i.e., corresponding to different values of k can be readily combined in the end. This can increase the parallelism and performance. On the other hand, if a certain partial results $\Phi^{(p)}(j,:)$ for the p-th mode index j cannot be computed independently by one processor, the corresponding partial results from all the processors contributing to the computation of $\Phi^{(p)}(j,:)$ are combined, e.g., via matrix addition, and then the computation of $A^{(p)}(j,:)$ is performed.

In order to maximize parallelism, the operations are distributed based on a grouping of indices associated with the first mode in the selected mode order. For example, referring again to FIG. 7A, the computations associated with Tuples 1, 2, and 3 can be grouped together and assigned to Processor A. The computations associated with Tuples 4, 5, and 6 can all be assigned to another processor (e.g., Processor B), or may be distributed further. For example, the computations associated with Tuple 4 can be assigned to Processor B, and the computations associated with Tuples 5 and 6 can be grouped together and assigned to Processor C. In both of these cases, each processor can compute the corresponding $\Phi^{(p)}(k,:)$ independently of other processors, and the computation of $A^{(n)}$, which is a refinement or a revision operation, can be merged with the corresponding computation of $\Phi$, which can improve memory locality and/or parallelism.

The tasks of determining the grouping of indices and associated computations and distribution of those computations to two or more processors may be performed by a master processing unit. The master processing unit can be one of the processors used for the computation of the tensor operations, or the master processing unit can be a distinct computing system.

We integrated the optimizations described herein into ENSIGN, a commercially available tensor decomposition package containing high-performance C implementations of a variety of tensor decomposition methods. The data structures used in ENSIGN provide a foundation for a broad range of decomposition methods and tensor sizes, and are not specifically optimized for any particular application. In various embodiments, we improved ENSIGN's tensor decomposition methods using one or more optimizations featuring partial result reuse discussed above. ENSIGN uses only the conventional data structures that uses complete index tuples for identifying, accessing, and storing tensor elements. In some embodiments, the data structures we used in our optimized methods are themselves optimized sparse tensor data structures, namely, mode-specific sparse (MSS) tensor and mode-generic sparse (MGS) tensor data structures. These structures are described in Applicant's co-pending U.S. patent application Ser. No. 13/898,159, entitled "Efficient and Scalable Computations with Sparse Tensors," filed on May 20, 2013, the entire contents of which are incorporated herein by reference. The use of these optimized data structures can further improve (i.e., decrease) memory usage. In some embodiments, the implemented methods are parallelized and optimized for load balancing and data locality.

Experimental Results and Examples

We now describe detailed experimental studies on the evaluation of different embodiments of our techniques to improve the memory efficiency and parallel performance and scalability of sparse tensor computations on multi-core systems.

Datasets: We use multiple real datasets from different application domains to evaluate the techniques described in our work. Table I describes the datasets. These datasets are of different size and non-zero structure. These datasets represent a good mix of datasets that are being used by Reservoir Labs for real critical analysis in the fields of cybersecurity and bioinformatics (e.g. Cyber and Alzheimers datasets) and datasets that are being used by the tensor community. Different CP decomposition methods are suited for different types of datasets and/or different domains and give qualitatively different results. In particular, we have seen CP-APR to be very useful for analyzing sparse count data and hence suited for cybersecurity and geospatial intelligence analysis. For our experiments, we use a decomposition rank of 30 for all datasets except NYC-taxi (rank of 100) and Cyber (rank of 50) datasets.

| Dataset | NNZ | Tensor Dimensions | Domain |
|---|---|---|---|
| Cyber [18] | 87M | [10M, 9K, 71K, 40K] | Cybersecurity |
| NYC-taxi [19] | 2M | [168, 15K, 38K] | Geospatial |
| VAST [20] | 26M | [165K, 11K, 2, 100, 89] | Geospatial |
| Flickr [21] | 112M | [319K, 28M, 1.6M, 731] | Social network |
| Alzheimers [22] | 6M | [5, 1309, 156, 1047, 396] | Bioinformatics |
| NELL [23] | 76M | [12K, 9K, 28K] | NLP |

Experimental system: We use a modern multi-core system to evaluate our techniques. The system we use is a quad socket 8-core system with Intel Xeon E5-4620 2.2 GHz processors (Intel Sandy Bridge microarchitecture chips). The system has 128 GB of DRAM.

Baseline and optimized versions for evaluation: The baseline versions of CP-APR, CP-ALS, and CP-ALS-NN methods are the latest "default" versions of these methods in ENSIGN without the optimizations discussed in various embodiments. The default versions in ENSIGN are otherwise highly optimized for parallelism and locality. The "optimized" versions include the optimizations discussed in various embodiments such as selective rematerialization of sparse KRP (for CP-APR), exploitation of redundancy in non-zero structure, and fusion of sparse tensor and matrix operations.

Memory Efficiency

Figure 8:
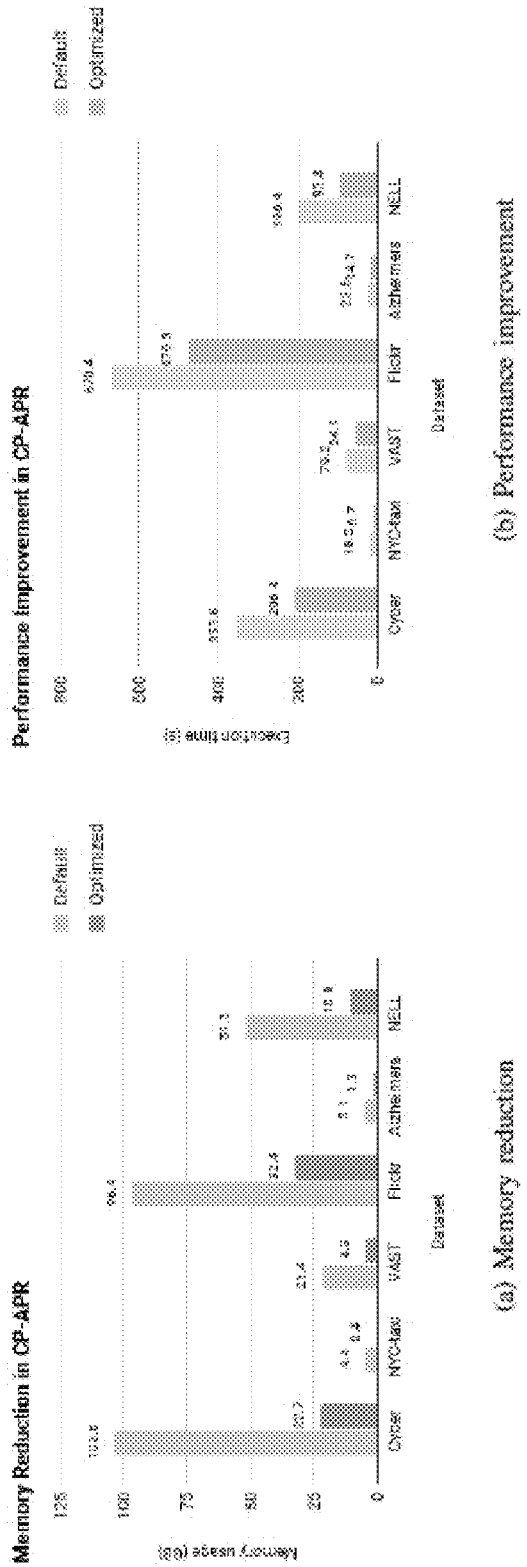
FIGS. 8(a) and 8(b) show memory reduction and performance improvement, respectively, of the CP-APR algorithm, according to various embodiments.
Figure 9:
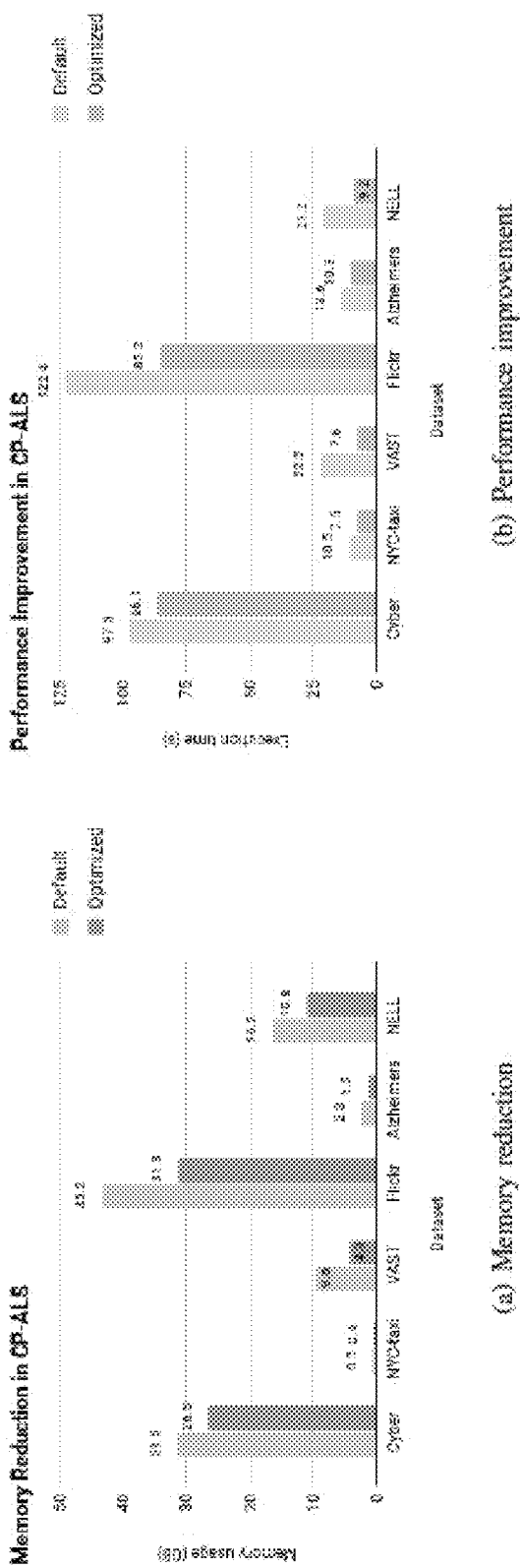
FIGS. 9(a) and 9(b) show memory reduction and performance improvement, respectively, of the CP-ALS algorithm, according to various embodiments.
Figure 10:
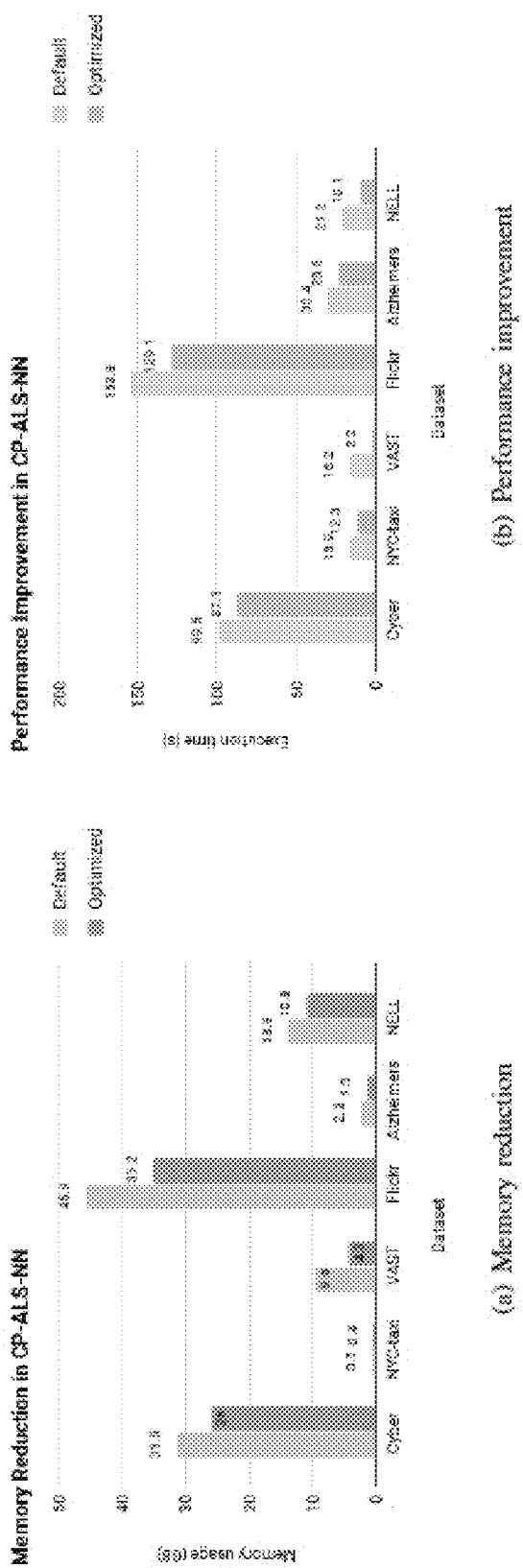
FIGS. 10(a) and 10(b) show memory reduction and performance improvement, respectively, of the CP-ALS-NN algorithm, according to various embodiments.

We characterize memory usage in the core computational portion (i.e. the significant portion of execution) of the three tensor decomposition methods. We measure maximum "resident set size" (RSS) to characterize memory usage. FIGS. 8(a), 9(a), and 10(a) show the memory usage by CP-APR, CP-ALS, and CP-ALS-NN, respectively, on different datasets when these methods are executed on 32 cores. The figures clearly illustrate significant gains in terms of reduction in memory usage achieved using our techniques.

The most beneficial method in terms of memory efficiency is CP-APR due to selective rematerialization of sparse KRP. The NYC-taxi dataset has a significant 11× reduction in memory usage, while other datasets have a 3-5× reduction. More importantly, without the memory-efficient optimization, we would not have been able to apply CP-APR for datasets such as Cyber and Flickr for a larger decomposition rank (rank≥85 for Cyber and rank≥65 for Flickr). The memory usage characteristics of CP-ALS and CP-ALS-NN are very similar, as they are similar algorithmically. The memory reduction is between 20% and 70% for all datasets, except VAST that has a 2× reduction.

Performance Improvement

We characterize the performance of the three tensor decomposition methods by measuring the overall execution time of the methods (and not just the core computation kernels). FIGS. 8(b), 9(b), and 10(b) show the performance improvement in terms of reduced execution time achieved using our techniques. The NELL dataset has significant improvement (2×) across all methods because the redundancy in non-zero structure of the dataset is better exploited. For CP-APR, the NYC-taxi geospatial dataset achieves 2.75× and the Cyber dataset achieves 1.75× improved performance. The other datasets achieve a 40-50% improvement. For CP-ALS and CP-ALS-NN, the VAST dataset achieves significant improvement (3× for ALS and 7× for ALS-NN). The other datasets achieve a 20-40% improvement.

Overall, the reduced memory pressure reduces cache misses and processor stall cycles and leads to improved execution time. Further, efficient sparse KRP computation also reduces the number of computations (significantly, in some datasets) and associated memory accesses and contributes to improved execution. Also, the parallel performance and speedup are improved due to reduced synchronizations and improved data locality resulting from fusion of tensor-matrix operations.

Scalability

Figure 11:
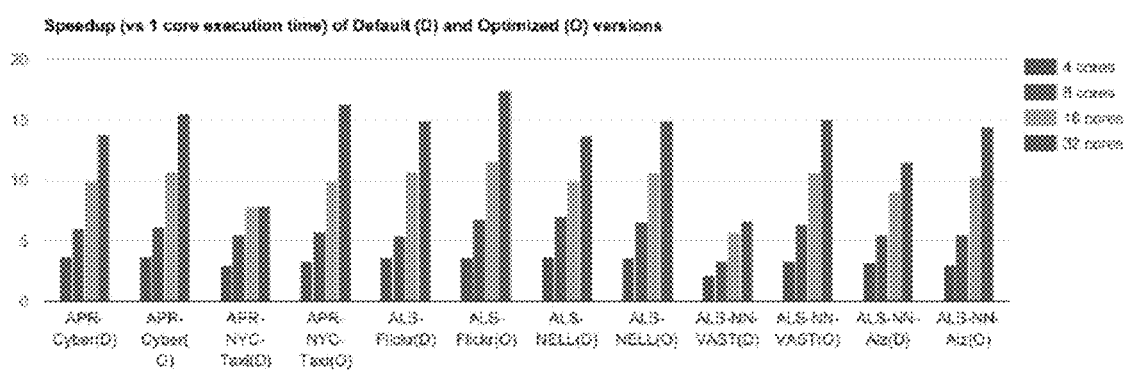
FIG. 11 shows for different applications and different core configurations, the speed-ups that can be achieved according to a particular embodiment relative to the traditional CP-APR, CP-ALS, and CP-ALS-NN algorithms as applied to those applications.

The optimized version achieves better speedup than the default version in all methods across all datasets. FIG. 11 shows the speedup (on a selected datasets-to-methods combination) achieved by the default and optimized versions on 4, 8, 16, and 32 cores compared to 1 core. The selection is based on the "practical" fit of the tensor decomposition method on the dataset or application domain. We observe around 15-16× speedup factor on 32 cores. The speedup improvement of optimized versions compared to default versions is around 10-25% for all datasets except NYC-taxi and Flickr datasets that show 2× improvement.

In summary, we have developed techniques that enable the use of powerful tensor decomposition methods in critical real-world applications across multiple domains such as cyber-security, geospatial intelligence, bioinformatics, NLP, and social network analysis. We have implemented high-performance tensor decomposition methods that can scale well on modern and advanced HPC systems.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for minimizing at least one of memory usage and processor usage while processing a tensor having N modes, wherein N≥3, the method comprising the steps of:
    selecting a pair of first and second index tuples, each having N indices, in a selected mode order, and each index tuple identifying a respective non-zero tensor element;
    identifying a first sub-tuple of one or more indices common to both the first and second index tuples;
    allocating memory space for at least one partition in a partitioned buffer space having three partitions comprising: (i) a first partition comprising one buffer corresponding to a selected tensor mode (p); (ii) a second partition comprising at least one buffer corresponding to one or more tensor modes lower than the selected mode in the mode order; and (iii) a third partition comprising at least one buffer corresponding to one or more tensor modes higher than the selected mode in the mode order;
    storing a set of partial results, obtained from a first set of computations corresponding to the first index tuple, in the partitioned buffer space; and
    in performing a second set of computations corresponding to the second index tuple, accessing and reusing, using the first sub-tuple, a first partial result from one of the partitions of the partitioned buffer space, thereby minimizing processor usage in performing the second set of computations.

2. The method of claim 1, wherein:
    identifying the first sub-tuple comprises identifying a first sequence of one or more indices in the mode order and common to both the first and second index tuples, wherein the first sequence comprises:
        an index corresponding to a first start mode and an index corresponding to a first end mode; and
        each index in the mode order from the first start index to the first end index.

3. The method of claim 2, further comprises:
    identifying a second sub-tuple by identifying a second sequence of one or more indices in the mode order and common to both the first and second index tuples, wherein the second sequence comprises:
        an index corresponding to a second start mode and an index corresponding to a second end mode; and
        each index in the mode order from the second start index to the second end index; and
    in performing the second set of computations, accessing and reusing, using the second sub-tuple, a second partial result from one of the partitions of the partitioned buffer space, thereby further minimizing the processor usage in performing the second set of computations.

4. The method of claim 3, wherein the first partial result and the second partial result are accessed from two different partitions.

5. The method of claim 1, wherein:
    the first set of computations comprises a first computation and a second computation;
    a partial result of the first computation is stored in the partitioned buffer space and reused in the second computation; and
    a partial result of the second computation is stored in the partitioned buffer space.

6. The method of claim 5, wherein the first partial result comprises one of: the partial result of the first computation or the partial result of the second computation.

7. The method of claim 1, wherein:
    the second set of computations comprises a first computation; and
    the first partial result is designated as a result of the first computation without performing that computation.

8. The method of claim 7, wherein the second set of computations comprises a second computation using the result of the first computation, the method further comprising:
    performing the second computation; and
    storing a result of the second computation in the partitioned buffer space in a buffer associated with an index higher in the mode order than a highest index in the first sub-tuple.

9. The method of claim 1, wherein:
    the buffer spaces comprises at most N buffers, each buffer of size equal to a rank of the tensor, bounding a memory size of the buffer space to at most to N times the rank of the tensor, wherein the memory size is independent of both a size of the tensor and a number of non-zero elements in the tensor.

10. The method of claim 1, wherein:
    each of the first and second sets of computations comprises modified CANDECOMP/PARAFAC (CP) tensor decomposition computations, the modification comprising:
        eliminating storage of a partial result of a matrix operation, the result having a size proportional to a number of non-zero elements in the tensors times a rank of the tensor, for reducing memory usage; and
        repeating a matrix operation included in the CP tensor decomposition at least once.

11. The method of claim 1, wherein each of the selecting, identifying, storing, and accessing and reusing steps, but not the allocating step, is iterated for each mode of the tensor, designating in each iteration, a mode corresponding to that iteration as the selected mode, resulting in minimization of processor usage while bounding memory usage across all iterations.

12. The method of claim 1, wherein the mode order is selected based on respective sizes of each mode.

13. The method of claim 1, wherein all index tuples corresponding to non-zero tensor elements are hierarchically sorted according to indices of modes from a start mode of the mode order to an end mode of the mode order.

14. The method of claim 1, further comprising distributing computations associated with the tensor across two or more processors, wherein the distribution is based on, at least in part, a number of non-zero elements in the tensor.

15. The method of claim 14, further comprising:
    identifying at least two groups of indices of the first mode in the mode order from the index tuples corresponding to the non-zero tensor elements, wherein:

in a first group, a particular first mode index is associated with more index tuples than any other first mode index in the first group; and the distribution is further based on, at least in part, the groups of first mode indices.

16. The method of claim 15, wherein:

indices of the first mode in the first group are different from indices of the first mode in a second group; and computations associated with the first group are allocated to a first processor; and computations associated with the second group are allocated to a different, second processor.

17. The method of claim 16, wherein the computations comprise computing a first partial result and revising a second partial result, the method further comprising merging by at least one of the first and second processors the respective revising of the second partial result with the respective computing of the first partial result.

18. The method of claim 15, wherein:

an index of the first mode is common to both the first group and a second group; and computations associated with the first group are allocated to a first processor; and computations associated with the second group are allocated to a different, second processor;

the computations comprise computing a first partial result and revising a second partial result; and the method further comprising:

adding respective results obtained from the first and second processors to obtain the first partial result; and subsequent to adding, revising the second partial result.

19. A system for minimizing at least one of memory usage and processor usage while processing a tensor having N modes, wherein N≥3, the system comprising:

a first processor; and a first memory in electrical communication with the first processor, the first memory comprising instructions which, when executed by a first processing unit comprising at least one of the first processor and a second processor, and in electronic communication with a memory module comprising at least one of the first memory and a second memory, program the first processing unit to:

select a pair of first and second index tuples, each having N indices, in a selected mode order, and each index tuple identifying a respective non-zero tensor element;

identify a first sub-tuple of one or more indices common to both the first and second index tuples;

allocate memory space for at least one partition in a partitioned buffer space having three partitions comprising: (i) a first partition comprising one buffer corresponding to a selected tensor mode (p); (ii) a second partition comprising at least one buffer corresponding to one or more tensor modes lower than the selected mode in the mode order; and (iii) a third partition comprising at least one buffer corresponding to one or more tensor modes higher than the selected mode in the mode order;

store a set of partial results, obtained from a first set of computations corresponding to the first index tuple, in the partitioned buffer space; and in performing a second set of computations corresponding to the second index tuple, access and reuse, using the first sub-tuple, a first partial result from one of the partitions of the partitioned buffer space, thereby minimizing processor usage in performing the second set of computations.

20. The system of claim 19, wherein, to identify the first sub-tuple, the instructions further program the first processing unit to:

identify a first sequence of one or more indices in the mode order and common to both the first and second index tuples, wherein the first sequence comprises:

an index corresponding to a first start mode and an index corresponding to a first end mode; and each index in the mode order from the first start index to the first end index.

21. The system of claim 20, wherein the instructions further program the first processing unit to:

identify a second sub-tuple by identifying a second sequence of one or more indices in the mode order and common to both the first and second index tuples, wherein the second sequence comprises:

an index corresponding to a second start mode and an index corresponding to a second end mode; and each index in the mode order from the second start index to the second end index; and in performing the second set of computations, access and reuse, using the second sub-tuple, a second partial result from one of the partitions of the partitioned buffer space, thereby further minimizing the processor usage in performing the second set of computations.

22. The system of claim 21, wherein the first partial result and the second partial result are accessed from two different partitions.

23. The system of claim 19, wherein:

the first set of computations comprises a first computation and a second computation;

a partial result of the first computation is stored in the partitioned buffer space and reused in the second computation; and a partial result of the second computation is stored in the partitioned buffer space.

24. The system of claim 23, wherein the first partial result comprises one of: the partial result of the first computation or the partial result of the second computation.

25. The system of claim 19, wherein:

the second set of computations comprises a first computation; and the instructions program the first processing unit to designate the first partial result as a result of the first computation without performing that computation.

26. The system of claim 25, wherein the second set of computations comprises a second computation using the result of the first computation, the instructions further program the first processing unit to:

perform the second computation; and store a result of the second computation in the partitioned buffer space in a buffer associated with an index higher in the mode order than a highest index in the first sub-tuple.

27. The system of claim 19, wherein:

the buffer spaces comprises at most N buffers, each buffer of size equal to a rank of the tensor, bounding a memory size of the buffer space to at most to N times the rank of the tensor, wherein the memory size is independent of both a size of the tensor and a number of non-zero elements in the tensor.

28. The system of claim 19, wherein:

each of the first and second sets of computations comprises modified CANDECOMP/PARAFAC (CP) tensor decomposition computations, and the instructions further program the first processing unit to perform the modification by:

eliminating storage of a partial result of a matrix operation, the result having a size proportional to a number of non-zero elements in the tensors times a rank of the tensor, for reducing memory usage; and repeating a matrix operation included in the CP tensor decomposition at least once.

29. The system of claim 19, wherein the instructions program the first processing unit to:

iterate each of the select, identify, store, and access and reuse operations, but not the allocate operation, for each mode of the tensor; and designate in each iteration, a mode corresponding to that iteration as the selected mode, resulting in minimization of processor usage while bounding memory usage across all iterations.

30. The system of claim 19, wherein the instructions program the first processing unit to select the mode order based on respective sizes of each mode.

31. The system of claim 19, wherein the instructions program the first processing unit to sort hierarchically all index tuples corresponding to non-zero tensor elements according to indices of modes from a start mode of the mode order to an end mode of the mode order.

32. The system of claim 19, further comprising a second processing unit, wherein:

computations associated with the tensor are distributed across two or more processing units, including the first and second processing units; and the distribution is based on, at least in part, a number of non-zero elements in the tensor.

33. The system of claim 32, further comprising a master processing unit, wherein at least a part of the instructions, when executed by the master processing unit, program the master processing unit to:

identify at least two groups of indices of the first mode in the mode order from the index tuples corresponding to the non-zero tensor elements, wherein:

in a first group, a particular first mode index is associated with more index tuples than any other first mode index in the first group; and the distribution is performed by the master processing unit and is further based on, at least in part, the groups of first mode indices.

34. The system of claim 33, wherein:

indices of the first mode in the first group are different from indices of the first mode in a second group; and computations associated with the first group are allocated to the first processing unit; and computations associated with the second group are allocated to a different, second processing unit.

35. The system of claim 34, wherein:

the computations comprise computing a first partial result and revising a second partial result; and the instructions further program at least one of the first and second processing units to merge the respective revising of the second partial result with the respective computing of the first partial result.

36. The system of claim 33, wherein:

an index of the first mode is common to both the first group and a second group; and computations associated with the first group are allocated to the first processing unit; and computations associated with the second group are allocated to a different, second processing unit;

the computations comprise computing a first partial result and revising a second partial result; and the instructions further program at least one of the first and second processing units to:

add respective results obtained from the first and second processors to obtain the first partial result; and subsequent to the addition operation, revise the second partial result.

* * * * *